G. C. JETT.
TRACTOR CHAIN TREAD.
APPLICATION FILED MAY 20, 1916.
1,222,295.
Patented Apr. 10, 1917.
2 SHEETS—SHEET 2.
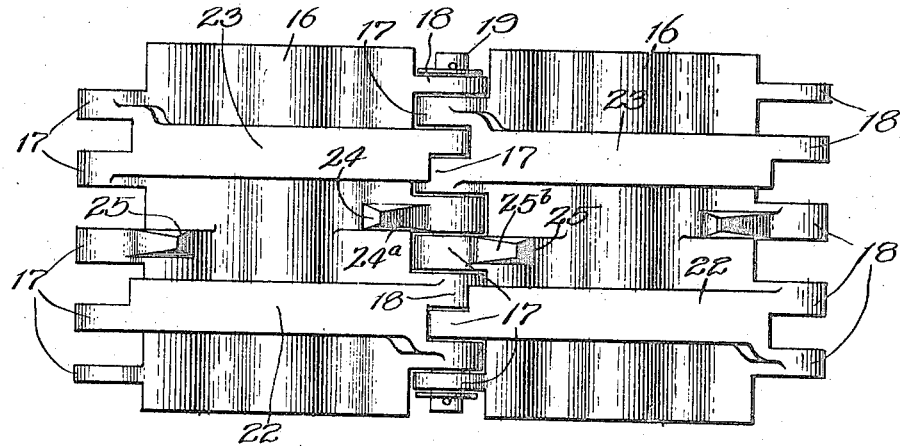
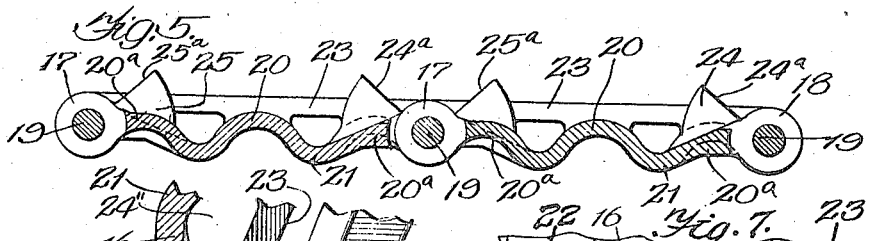
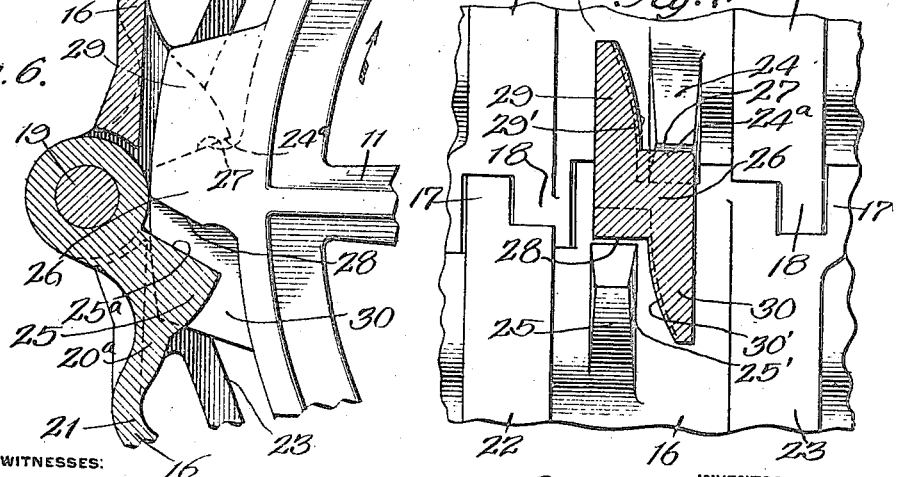
WITNESSES:
INVENTOR
George C. Jett

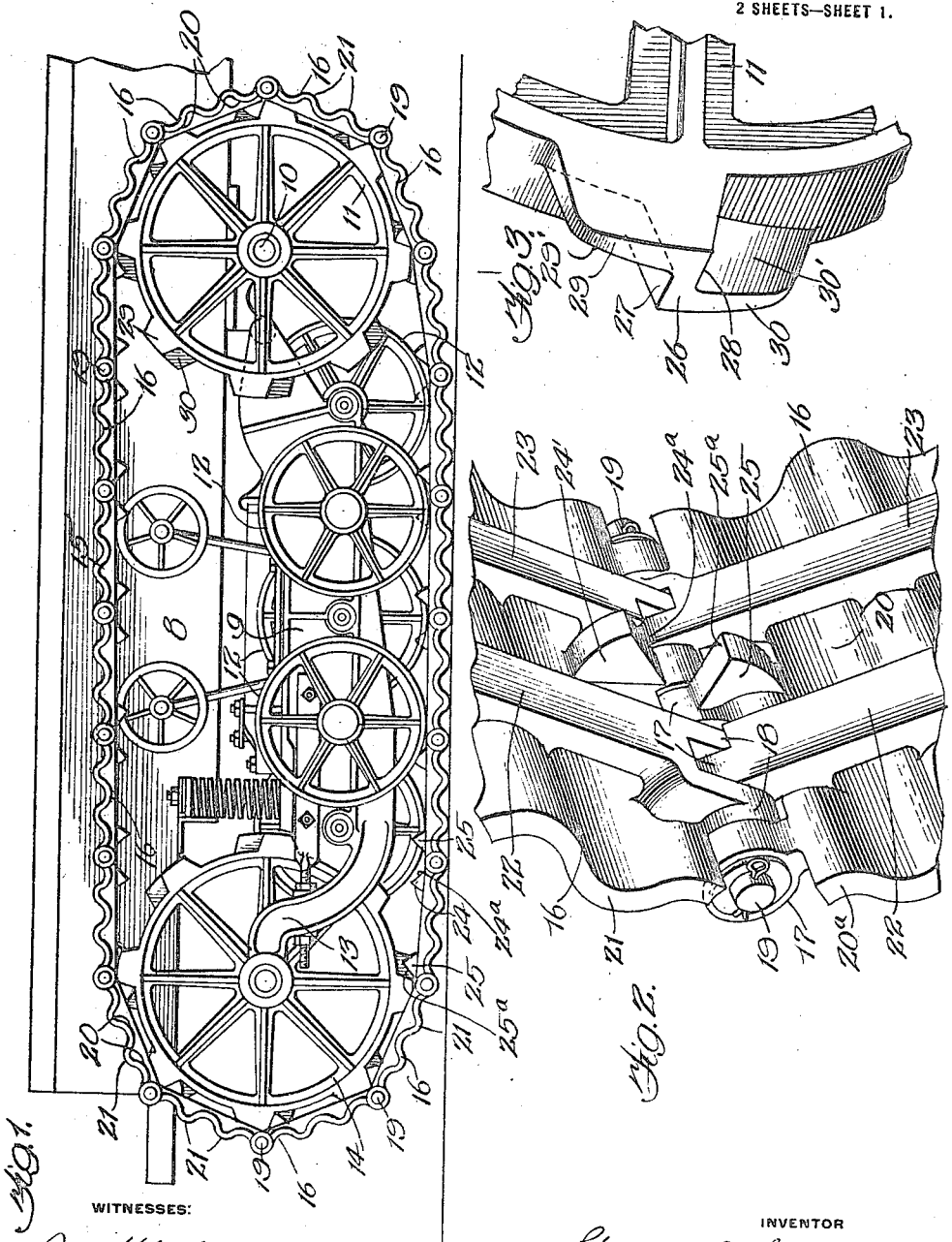

UNITED STATES PATENT OFFICE.

GEORGE C. JETT, OF GARY, INDIANA.

TRACTOR CHAIN TREAD.

1,222,295.  Specification of Letters Patent. Patented Apr. 10, 1917.

Application filed May 20, 1916. Serial No. 98,747.

*To all whom it may concern:*

Be it known that I, GEORGE C. JETT, a citizen of the United States, residing at Gary, in the county of Lake and State of Indiana, have invented certain new and useful Improvements in Tractor Chain Treads, of which the following is a full, clear, and exact specification, such as will enable others skilled in the art to make and use the same, reference being had to the annexed drawings, forming a part of this specification.

My present invention relates generally to the endless chain type of tractors, and has reference more particularly to the endless chain tread and coöperating sprocket wheels designed for use in a tractor of this type.

The main objects of this invention are as follows: First, to provide an endless tread of simple and efficient character composed of tread members capable of being readily and cheaply made and as easily assembled and applied to the machine. Second, the provision of an endless tread designed to have the quality of maximum durability and to insure the reduction of wear and breakage to a minimum. Third, to produce an endless tread admitting of a wide variation in the width of treads for service on the same machine so as to adapt it to differing classes of soils. Fourth, to produce a structure composed of track members having the qualities of maximum strength and minimum weight, and wherein the fewest possible number of moving or rotating parts are employed, consistent with the duty to be performed and the objects sought to be accomplished. Fifth, the provision of novel means designed to eliminate any possibility of slippage between the chain and its sprockets. Sixth, to provide an endless chain tread having long bearings at pivotal joints, and formed on its outer face with gripping means, and on its inner face with smooth continuous tracks for the weight bearing wheels to noiselessly travel upon. And seventh, to provide a novel construction and arrangement of tread and sprocket adapted to hold the endless belt in transverse and horizontal alinement regardless of the amount of wear encountered or of possible variation in lengths of tread members due to any inaccuracy in workmanship or other causes, and to effectually reduce friction between the weight bearing wheels and the tracks upon which they travel.

These, together with such other objects as may hereinafter appear, or are incident to my invention, I attain by means of the construction illustrated in preferred form in the accompanying drawings, wherein:—

Figure 1 is a side elevation of a tractor truck to which my invention is shown applied.

Fig. 2 is a view in perspective of the hinged portion of two associated tread shoes and their lugs as they would appear in passing over one of the sprockets;

Fig. 3 represents a perspective view of a fragmentary portion of the sprocket, illustrating one of its flanged teeth which would when operatively positioned be brought into engagement with the lugs shown in Fig. 2;

Fig. 4 is a plan view of a pair of hinged tread shoes;

Fig. 5 is a longitudinal section of the members in Fig. 4 taken along a line just to one side of the lugs; and Figs. 6 and 7 represent enlarged detail views, partly in section, illustrating the engaging relation between the flanged sprocket teeth and the tread shoe lugs.

Referring to the drawings, and more particularly to Fig. 1, the numeral 8 indicates the frame of a tractor, 9 the tractor truck associated with said frame and the drive axle 10 in any suitable manner, and the numeral 11 designates the driving sprocket wheel which is secured upon the said drive axle. Mounted in the truck 9 is a series of bearing wheels 12, and at its forward end 13 is journaled an idler sprocket wheel 14. The endless chain tread 15 passes around the driving and the idler sprocket wheels, 11 and 14, the bearing wheels 12 being provided to transmit the weight of the tractor directly to the lower stretch of the endless chain tread. The tread faces of these bearing wheels are smooth and are not provided with the customary wheel face flanges.

From an inspection of the drawings, it will be seen that the endless chain tread is composed of pivotally connected tread shoes 16, each of any desired breadth and preferably of a length slightly greater than the distance between points where adjacent bearing wheels contact with the lower stretch of the endless tread, in order to obviate buckling of the tread shoes when passing over uneven ground. These shoes are hinged together by means of a series of interlocking apertured tongues 17, 18, linked together by a pivot pin 19 of relatively large diameter. The tongues and pivot pin are substantially co-extensive with the breadth of the shoe, the former enveloping the latter throughout and thereby affording a maximum bearing area along this pivotal line.

In order that the tread may take a firm grip upon the ground, the web 20 of each shoe 16 is sinuously formed to provide ground gripping ribs 21 on its under face, and, as will be apparent from an inspection of Fig. 5, the web portions 20ª at each side of the shoe incline in an upward direction from the ribs 21 to merge centrally with the hinge tongues, which latter in turn depend as a unit to constitute a supplementary ground gripping element.

In each shoe the web 20 extends upwardly to provide the spaced tracks 22 and 23 for the weight bearing wheels 12, and is cored out at 24'' to effect a material reduction in the weight and cost of the shoe. The top line of the tracks and that of the hinge lie in the same plane. Mention has already been made of the hinge tongues 17, 18, and as will be seen from an inspection of Figs. 2 and 5 each of said tracks has at both ends a tongue of relatively lesser width so as to leave a groove at each track terminal, whereupon in the coupling of the shoes together the tongues of the one fit into the grooves of the other, affording smooth joints and uninterrupted planes for the weight bearing wheels to roll over, and in a manner eliminating jolt and noise. Draft means are provided to be engaged by the driving sprocket wheels, and take the form of lugs which are designated by the numerals 24 and 25 in the drawings. These lugs rise from the inclined web portion 20ª to points above the top line of the hinge and also preferably that of the tracks 22 and 23, and are disposed in a staggered relation between the tracks and at the sides of the shoe, so that when the shoes are associated, adjacent lugs 24 and 25 are brought into juxtaposition in the manner indicated in the drawings, the drive faces 24ª and 25ª of which are true planes and merge with the webs of adjacent hinge tongues.

The driving sprocket wheel 11, and also the idler sprocket wheel 14, is peripherally formed with a series of sprocket teeth 26 having driving faces 27 and 28 respectively designed in the travel of the wheel in one direction or the other to engage the lug faces 24ª and 25ª, and also provided with oppositely extending guide flanges 29 and 30 designed to shroud the lugs, (Fig. 7). These driving faces, 27 and 28, are true planes set at angles with reference to the radial line of the wheel and accord with the angular set of the drive faces of the lugs when the chain tread is passing over the sprocket wheels. The inner faces 24' and 25' of the lugs 24, 25, are designed to contact with the corresponding alternate inner faces 29' and 30' of the teeth flanges and thereby in providing a number of such contact points on the front and rear sprocket wheels the endless chain tread is maintained in its proper alinement for the weight bearing wheels to roll on and positively secured against slippage. Each of these inner faces, 29' and 30', has an angularity slightly greater than 90° with the plane of the tooth faces and with the axis of rotation, and desirably may be slightly convex in its conformation.

As more clearly shown in Fig. 6, the contact between driving and driven faces is on surfaces of predetermined width and length. In other words, in contradistinction to the wiping contact heretofore employed, the contact attained in my construction is a fixed quantity and provides for an engagement on large true planes in which the surfaces are always in correct alinement regardless of wear or variations in shoe lengths due to inaccuracy in workmanship. Furthermore, since the driven lugs project inwardly for engagement with the flanged tooth, the web and tracks of a tread member are thus spaced away from that portion of the wheel periphery intermediate adjacent teeth and provide an adequate clearance therebetween for the working out of foreign substances which might be carried up as the tread leaves the ground.

From the foregoing, the essential features, elements, and operation of my improved device, together with its simplicity and other advantages thereof, will be clearly apparent to those skilled in the art.

I do not desire to be understood as limiting myself to the precise details of construction and arrangement shown, as variations and modifications in the features of construction and arrangement may be made without departing from the spirit and scope of my invention and improvements. I therefore reserve the right to all such variations and modifications as properly fall within the scope of my invention and the terms of the following claims.

What I claim is:—

1. In a traction device, the combination of a plurality of associated tread members having weight bearing webbed portions severally formed at each end with draft means and hinge elements, and pivotal connecting means for adjacent hinged ends of said portions, said draft means having driven faces projecting upwardly from the web of said portions at points adjacent said means.

2. In a traction member, the combination of a sprocket wheel having a sprocket tooth formed with plane driving faces disposed at an angle to the radial line of the wheel, and a chain tread comprising pivotally connected tread shoes provided at each side of the line of pivotal connection with corresponding relatively movable driven faces adapted to be engaged by said driving faces.

3. In a traction member, the combination of a sprocket wheel and a chain tread device respectively provided with angularly disposed plane driving and driven draft elements, one of said elements having a guide flange adapted to engage the other of the said elements.

4. A traction shoe provided with a bearing wheel track portion and a driven face portion disposed to one side of said track and having its face disposed at an angle to the plane of said track portion.

5. In a traction member, the combination of a sprocket wheel provided with a sprocket tooth having driving faces, and a pair of associated tread shoes formed with adjacent portions constituting driven faces adapted to be engaged by the driving faces of the said sprocket tooth.

6. In a traction member, the combination of a sprocket wheel provided with a sprocket tooth having plane driving faces, and a pair of hinged tread shoes provided with adjacent web portions at each side of the hinge, said portions having oppositely disposed driven faces corresponding substantially with the driving faces of the sprocket tooth.

7. In a traction member, the combination of a sprocket wheel provided with a sprocket tooth having driving faces, and a pair of tread shoe members hinged together and each having a bearing wheel track portion and a drive lug disposed to one side of the track portion and hinge, said drive lugs having oppositely disposed drive faces designed to be engaged by the driving faces of the sprocket tooth.

8. In a sprocket driven traction device, a pair of pivotally connected tread shoe members formed with draft elements having relatively movable driven faces disposed adjacent to the line of pivotal connection.

9. In a traction device, a tread member having an inner web portion and provided with outwardly projecting hinge elements at each end thereof, the hinge elements at one end of a member being staggered with reference to the hinge elements at the other end, and draft elements formed from the web portion of the tread member at each end thereof and having driven faces disposed adjacent said hinge elements.

10. In a traction device, the combination of a plurality of associated tread members severally provided with draft and hinge elements at each end thereof, a pivotal connection therefor, said hinge elements interfitting and associated at adjacent ends to provide an extended bearing for said pivotal connection, and longitudinally extending track portions on said members merging with the bearing adjacent said draft elements.

11. A traction mechanism comprising a tread composed of serially arranged tread shoes, adjacent shoes having a pivotal connection and provided with draft lugs having opposing driven faces adjacent to said pivotal connection, and a driving wheel for said tread having driving elements, each of which formed with offset guiding faces for said lugs and driving faces for said driven faces, adjacent draft lugs constructed and arranged to constitute a single draft means in the travel of adjacent shoes about said driving wheel, substantially as and for the purposes set forth.

12. A sprocket wheel having a sprocket tooth integrally formed with oppositely and diagonally disposed driving faces and guide flanges.

13. In combination, a sprocket wheel formed with driving faces, and pivotally connected shoe members having oppositely and diagonally disposed driven faces straddling the pivotal connection of the shoes and adapted to be engaged by the driving faces of the wheel.

14. In a traction member, the combination of a sprocket wheel formed with driving face portions, and a pair of pivotally connected tread shoe members having a driven face portion formed in the web of each of said members, said driven face portions being oppositely disposed and positioned adjacent the pivotal connection of the shoe members and adapted to be engaged by the driving face portions of the wheel, both of said portions formed with faces disposed in a corresponding plane whereby to provide a fixed contactual engagement therebetween in the rotation of the wheel.

15. In a traction member, the combination of a sprocket wheel formed with driving face portions, and a pair of pivotally connected tread shoes having a bearing wheel track and a driven face portion formed in the web of each of said members, said tracks and said driven face portions extending toward the pivotal connection of the shoes and said driven face portions constructed and arranged to have a fixed contactual engagement with said driving face portions in the travel of the wheel, and a guide flange for one of said face portions.

16. In a machine of the character described, the combination of a frame, a wheel member associated with said frame, a traveling belt traction member engaged by said wheel, and bearing wheels designed to engage a portion of said traveling belt traction member in the travel of said traction member, said members having co-acting draft elements provided with guiding means constructed and arranged to maintain said traction member portion in operative relation with said bearing wheels.

17. In a traction member, the combination of a pair of webbed tread members having a pivotal connection and terminally formed with a series of marginal hinge elements providing an extended bearing for said pivotal connection, the webs of said tread members transversely sinuate, and track portions formed from the upper part of said web extending horizontally in a longitudinal direction to merge with said bearing, and draft means adjacent said bearing having driven faces radially disposed with reference to the axis of said connection.

18. In a traction device, the combination of a sprocket wheel and a chain tread member provided with draft elements, the draft element of the sprocket wheel having a driving face and the draft element of the tread member having a driven face adapted to be engaged by said driving face, one of said elements formed with a guide flange for guiding the engagement of the faces in the travel of the sprocket wheel.

19. In a traction device of the character described, the combination of a sprocket wheel provided with draft elements having driving faces and guiding means, and a plurality of pivotally connected shoes provided with draft elements adapted to be guided by said guiding means in the travel of the sprocket wheel, said last mentioned draft elements having driven faces disposed adjacent the pivotal connection of the shoes and constructed to be engaged by the driving faces of the first mentioned draft elements.

20. In a traction device, the combination of a plurality of associated tread members severally formed adjacent the ends thereof with draft and hinge elements, pivotal connecting means for adjacent hinge elements, said draft means having driven faces extending toward the axis of said connection, and a driving member for said tread members provided with driving faces and guide flanges adapted to drive said driven faces and guide said tread members, substantially as described.

21. In a traction device, the combination of a sprocket provided with a tooth having driving faces, and a plurality of tread shoe members therefor having a pivotal connection and provided with adjacently disposed draft elements having driven faces adapted to be engaged by said driving faces, said draft elements relatively movable on arcs having a common axis in said pivotal connection.

22. In a traction device, the combination of a sprocket provided with a tooth having driving faces, a plurality of tread shoe members therefor having a pivotal connection and provided with adjacently disposed draft elements having driven faces adapted to be engaged by said driving faces, said draft elements relatively movable on arcs having a common axis in said pivotal connection, and guide means for said draft elements.

23. In a machine of the character described, the combination of a driving member and a driven traction belt device having a longitudinal inner portion and composed of a series of pivotally connected tread shoe members, and a weight bearing wheel designed to bear on said portion of the belt device in the travel of the same along the ground, said driving and tread members respectively provided with co-active driving and driven draft elements having guiding means constructed and arranged to maintain said longitudinal inner portion in alined relation with said bearing wheel, and said driven draft elements located adjacent the line of pivotal connection of adjacent tread shoe members and relatively movable during the co-action therewith of the driving elements.

In testimony whereof I have hereunto signed my name and affixed my signature.

GEORGE C. JETT.